(12) United States Patent
Wang

(10) Patent No.: US 11,552,978 B2
(45) Date of Patent: Jan. 10, 2023

(54) DISASTER SECURITY CALCULATION METHOD, AND USER TERMINAL AND NON-TRANSITORY MEDIUM IMPLEMENTING SAME

(71) Applicant: Fulian Precision Electronics (Tianjin) Co., LTD., Tianjin (CN)

(72) Inventor: Shih-Cheng Wang, New Taipei (TW)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 427 days.

(21) Appl. No.: 16/835,625

(22) Filed: Mar. 31, 2020

(65) Prior Publication Data

US 2021/0203685 A1 Jul. 1, 2021

(30) Foreign Application Priority Data

Dec. 30, 2019 (CN) .......................... 201911398062.1

(51) Int. Cl.
*H04L 9/40* (2022.01)
*G06N 3/04* (2006.01)
*G06N 3/08* (2006.01)

(52) U.S. Cl.
CPC .......... *H04L 63/1433* (2013.01); *G06N 3/04* (2013.01); *G06N 3/08* (2013.01)

(58) Field of Classification Search
CPC ......... H04L 63/1433; G06N 3/04; G06N 3/08
See application file for complete search history.

(56) References Cited

U.S. PATENT DOCUMENTS

| | | | |
|---|---|---|---|
| 9,666,000 B1* | 5/2017 | Schoenfelder | G07C 9/257 |
| 9,892,463 B1* | 2/2018 | Hakimi-Boushehri | H04L 12/2823 |
| 10,002,339 B2* | 6/2018 | Prieto | G06Q 10/067 |
| 10,747,606 B1* | 8/2020 | Shemer | G06F 11/079 |
| 10,819,556 B1* | 10/2020 | Rangasamy | H04L 41/0618 |
| 10,904,173 B2* | 1/2021 | Rangasamy | H04L 43/08 |
| 2011/0312354 A1* | 12/2011 | Nakamura | G08B 25/004 455/226.1 |
| 2016/0162372 A1* | 6/2016 | Whitehead | G06F 3/0689 707/654 |
| 2018/0348018 A1* | 12/2018 | Anders | G01M 5/0033 |
| 2020/0106801 A1* | 4/2020 | Evans | H04L 63/1433 |

* cited by examiner

*Primary Examiner* — Viral S Lakhia
(74) *Attorney, Agent, or Firm* — ScienBiziP, P.C.

(57) ABSTRACT

A disaster security resource calculation method includes obtaining disaster prevention data of a place to be evaluated and loss assessment data of the place in a disaster scenario, and determining disaster security resources required by the place to be evaluated in the disaster scenario using a preset calculation model according to the disaster prevention data and the loss assessment data. The disaster prevention data includes environmental information, item information, and personnel information.

15 Claims, 3 Drawing Sheets

DISASTER SECURITY CALCULATION METHOD, AND USER TERMINAL AND NON-TRANSITORY MEDIUM IMPLEMENTING SAME

FIELD

The subject matter herein generally relates to insurance, and more particularly to a disaster security calculation method, and a user terminal and a non-transitory medium implementing the disaster security calculation method.

BACKGROUND

More and more enterprise users create security accounts, which are kept by partners of the enterprise in case a disaster occurs. When a disaster occurs in the enterprise, resources in the security accounts will be transferred to the enterprise according to a preset ratio. Calculation of the amount of required security resources to be stored in the security accounts is very important. However, the existing calculation method of disaster security resources is inefficient and unintelligent.

BRIEF DESCRIPTION OF THE DRAWINGS

Implementations of the present disclosure will now be described, by way of embodiments, with reference to the attached figures.

DETAILED DESCRIPTION

Figure 1:
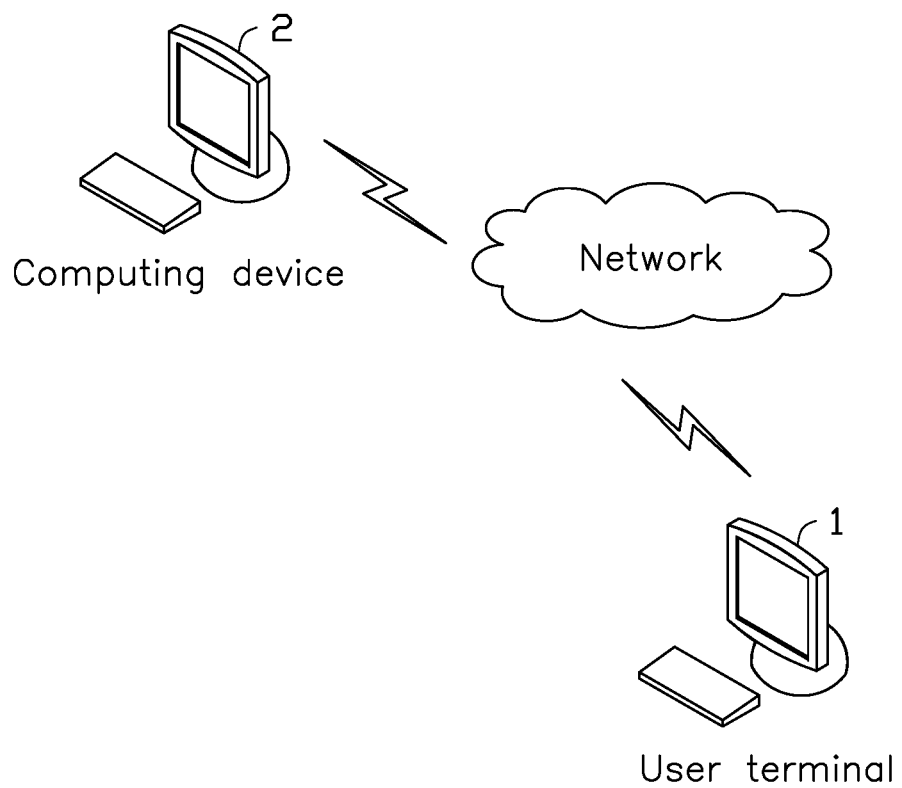
FIG. 1 is a schematic diagram of an application environment of a disaster security resource calculation method.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "comprising" means "including, but not necessarily limited to"; it specifically indicates open-ended inclusion or membership in a so-described combination, group, series and the like.

In general, the word "module" as used hereinafter refers to logic embodied in hardware or firmware, or to a collection of software instructions, written in a programming language such as, for example, Java, C, or assembly. One or more software instructions in the modules may be embedded in firmware such as in an erasable-programmable read-only memory (EPROM). It will be appreciated that the modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

FIG. 1 shows a schematic diagram of an application environment of a disaster security resource calculation method.

The disaster security resource calculation method is applied to a user terminal 1, which establishes a communication connection with a computing device 2 through a network. The network may be a wired network or a wireless network, such as radio, wireless fidelity (WIFI), cellular, satellite, and broadcast. The user terminal 1 is configured to obtain disaster prevention data of a place to be evaluated and loss assessment data of the place in a disaster scenario, and use a preset calculation model to analyze disaster security resources required by the place in the disaster scenario. The computing device 2 is used to store the disaster prevention data of different places, the loss assessment data of each place in a disaster scenario, and the disaster security resources of each place in the disaster scenario.

The user terminal 1 may be an electronic device such as a personal computer, a tablet computer, or the like that is installed with software for calculating the disaster security resources.

The computing device 2 may be an electronic device, such as a personal computer, a server, or the like, that can store the disaster prevention data of different places, the loss assessment data of each place in a disaster scenario, and the disaster security resources required by each place in the disaster scenario. The server may be a single server, a server cluster, or a cloud server.

In another embodiment, the disaster prevention data of different places, the loss assessment data of each place in the disaster scenario, and the disaster security resources required by each place in the disaster scenario may also be stored in the user terminal 1.

Figure 2:
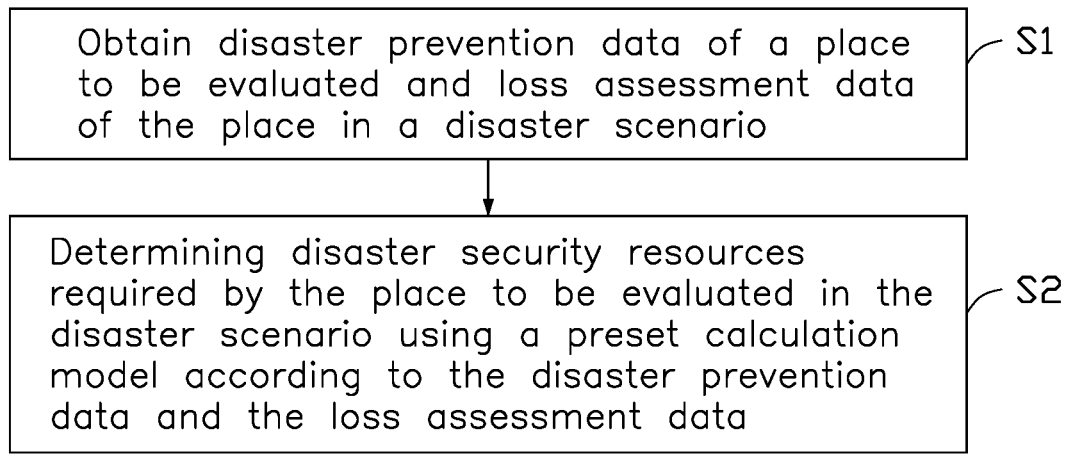
FIG. 2 is a flowchart of the disaster security resource calculation method.

FIG. 2 shows a flowchart of the disaster security resource calculation method. According to different embodiments, the order of blocks in the flowchart can be changed, and some blocks can be omitted or combined.

Block S1: Disaster prevention data of a place to be evaluated and loss assessment data of the place in a disaster scenario are obtained.

The disaster prevention data includes environmental information, item information, and personnel information. The environmental information may include environmental temperature and humidity information and information of a type, a quantity, and/or a location of fire protection equipment and exhaust vents. The fire protection equipment may include fire alarms, smoke alarms, ceiling fire sprinklers, fire detectors, and fire hydrants. The item information may include a type, a quantity, and a location of items in the place to be evaluated, the items may include manufacturing equipment, materials, office computers, and furniture in the place to be evaluated. The personnel information may include a quantity of personnel.

In one embodiment, the disaster prevention data of the place to be evaluated may be obtained by receiving the environmental information, the item information, and the personnel information input by a user. In another embodiment, the disaster prevention data of the place to be evaluated may be obtained by receiving multiple images captured by multiple camera devices, and using an image recognition method to identify the environmental information, the item information, and the personnel information.

In one embodiment, a method for obtaining the loss assessment data of the place in the disaster scenario includes:

Obtaining the disaster prevention data of the place to be evaluated, and simulating the place under different disaster scenarios through a disaster numerical simulation system to calculate the loss assessment data in each disaster scenario. The disaster numerical simulation system can be software installed in the user terminal 1. The loss assessment data in each disaster scenario may be calculated by setting a loss ratio of each item in the place in a unit time, and dividing the item according to a preset ratio, where each region of the item after division represents a minimum financial amount of the item lost in the unit time during a disaster. The loss assessment data of the place in each disaster scenario is calculated according to the loss ratio of the item in the unit time and the minimum financial amount.

For example, a lithographic machine is divided into 81 equal parts, a value of the lithographic machine is Y810,000, a value of each equal part is Y10,000, and a burning time of each equal part is 2 minutes. According to a disaster scenario where the lithography machine is located, a loss ratio of the lithography machine in a unit time of different disasters can be queried. For example, the loss ratio of the lithography machine in a fire scenario with a fire sprinkler and an automatic fire alarm in one minute is 2%, and a loss assessment data of the lithography machine in a 30-minute fire scenario can be calculated as Y150,000.

In another embodiment, the method for obtaining the loss assessment data of the place in the disaster scenario further includes:

Obtaining the disaster prevention data of the place to be evaluated, simulating the disaster prevention data of the place through a disaster prediction simulation system, and determining whether changes in the disaster prevention data will cause a disaster.

A method of determining whether the changes in the disaster prevention data will cause the disaster may include:

Dividing a range of change of the disaster prevention data of each place into a plurality of preset intervals;

Inputting the disaster prevention data of each place into the disaster prediction simulation system in accordance with a change rule of the interval; and Determining that the changes in the disaster prevention data will cause the disaster if the changes trigger a condition that causes the disaster, where the condition that causes the disaster includes temperature, dust content in air, and harmful gas concentration in the air.

For example, the place is a chemical product processing workshop, and a temperature change of the place is analyzed to determine whether an air quality in the place will deteriorate, and a reason for deterioration of the air quality is an increase of sulfide concentration in the air. All of the items in the chemical product processing workshop and an exhaust vent map of the chemical product processing workshop are input into the disaster prediction simulation system. The sulfide concentration in the air is calculated for every change of two degrees in temperature of the chemical product processing workshop. Whether the concentration of sulfide in the air changes with each temperature change is determined. If the sulfide concentration changes, the temperature change of the place is determined to be the reason that the air quality in the place deteriorates. If the sulfide concentration does not change, the temperature change of the place is determined to not affect the air quality of the place. When the temperature change affects the air quality of the place, the sulfide concentrations corresponding to different temperatures are stored, and the temperature corresponding to the sulfide concentration deteriorating the air quality is recorded.

Block S2: Disaster security resources required by the place to be evaluated in the disaster scenario are determined through a preset calculation model according to the disaster prevention data and the loss assessment data.

For example, the disaster security resource calculation method is applied to a resource calculation system of an insurance company. The disaster prevention data includes the environmental information, the item information, and the personnel information of a place to be insured. The loss assessment data may be a loss situation of the place to be insured in a fire, and the disaster security resources is a financial amount that the place needs to be insured. The disaster prevention data and the loss assessment data of the place to be insured are input into a preset calculation model, and the disaster security resources required by the place to be insured in the fire is output.

A training method of the preset calculation model includes the following steps:

(1) Obtaining the disaster prevention data of different places, the loss assessment data of each place in disaster scenarios, and the disaster security resources required by each place in the disaster scenarios, correspondingly storing the disaster prevention data, the loss assessment data, and the disaster security resources required by each place in the disaster scenario, and dividing the disaster prevention data, the loss assessment data, and the disaster security resources into a training set and a validation set.

The disaster security resources required for the place in the disaster scenario are the insured amounts historically invested in the place and are stored in the computing device 2.

For example, the computing device 2 is an electronic device used by an insurance company to store information. The electronic device stores historical insurance policy information of insured locations. The insurance policy information includes the disaster prevention data of the insured locations, the loss assessment data of the insured locations calculated by simulation through the disaster numerical simulation system, and the disaster security resources of the insured locations. The data in the historical insurance policy information is divided into a training set and a validation set.

(2) Establishing a calculation model based on a neural network, and training parameters of the calculation model using the training set, where the disaster prevention data and the loss assessment data in the training set are used as input data of the calculation model, and the disaster security resources are used as output data of the calculation model.

The calculation model based on the neural network includes a variety of algorithm structures, and may include a calculation model based on a convolutional neural network, a neural network based on a genetic algorithm, a neural network based on a fuzzy theory, and the like.

(3) Using the validation set to validate the trained calculation model, and statistically obtaining a prediction accuracy of the trained calculation model based on the validation results.

The disaster prevention data and the loss assessment data in the validation set are input into the calculation model, and the disaster security resources required by the place in the disaster scenario are calculated. The disaster security resources of the validation set are compared to the disaster security resources of the training set, and a prediction accuracy of the trained calculation model is validated based on the comparison results.

(4) Determining whether the prediction accuracy of the trained calculation model is less than a preset threshold.

In one embodiment, the preset threshold is 95%.

(5) If the prediction accuracy of the trained calculation model is not less than the preset threshold, ending the training of the calculation model.

(6) If the prediction accuracy of the trained calculation model is less than the preset threshold, adjusting a structure of the calculation model, and using the training set to retrain the adjusted calculation model, where the structure of the calculation model includes at least one of the number of convolution kernels, the number of elements in a pooling layer, and the number of elements in a fully connected layer.

(7) Using the validation set to validate the retrained calculation model, re-statistically obtaining the prediction accuracy of the retrained calculation model based on the validation results, and determining whether the prediction accuracy of the retrained calculation model is less than the preset threshold.

(8) If the re-statistically obtained prediction accuracy of the retrained calculation model is not less than the preset threshold, ending the training of the calculation model.

(9) If the re-statistically obtained prediction accuracy of the retrained calculation model is less than the preset threshold, repeating the above-mentioned adjustment and training steps until the prediction accuracy of the retrained calculation model is not less than the preset threshold.

The steps in the above preset training method of the calculation model can be changed according to actual needs, and some steps can be omitted. The training method can be completed online or offline.

Figure 3:
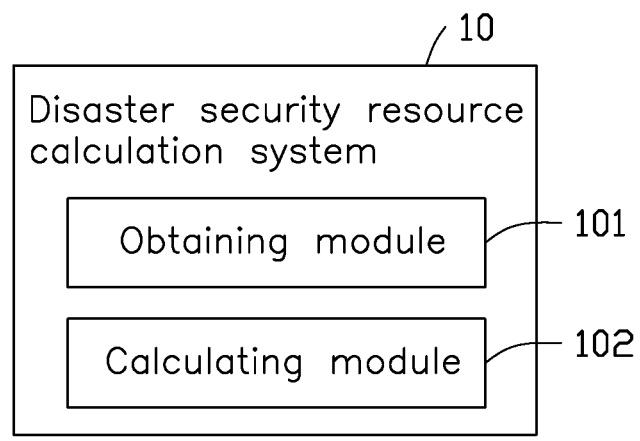
FIG. 3 is a schematic diagram of an embodiment of a disaster security resource calculation system.

FIG. 3 is a schematic diagram of an embodiment of a disaster security resource calculation system 10.

In some embodiments, the disaster security resource calculation system 10 runs in a user terminal. The user terminal is connected to a computing device through a network. The disaster security resource calculation system 10 may include a plurality of functional modules composed of program code segments. The program code segments in the disaster security resource calculation system 10 may be stored in a memory of the user terminal and executed by at least one processor to implement a disaster security resource calculation function.

In one embodiment, the disaster security resource calculation system 10 may be divided into a plurality of functional modules according to functions performed by the disaster security resource calculation system 10. Referring to FIG. 3, the functional modules may include an obtaining module 101 and a calculating module 102.

The obtaining module 101 is configured to obtain disaster prevention data of a place to be evaluated and loss assessment data of the place in a disaster scenario. The obtaining module 101 may implement functions of the method in block S1 as described above, and will not be described further.

The calculating module 102 is configured to determine disaster security resources required by the place to be evaluated in the disaster scenario through a preset calculation model according to the disaster prevention data and the loss assessment data. The calculating module 102 may implement functions of the method in block S2 as described above, and will not be described further.

Figure 4:
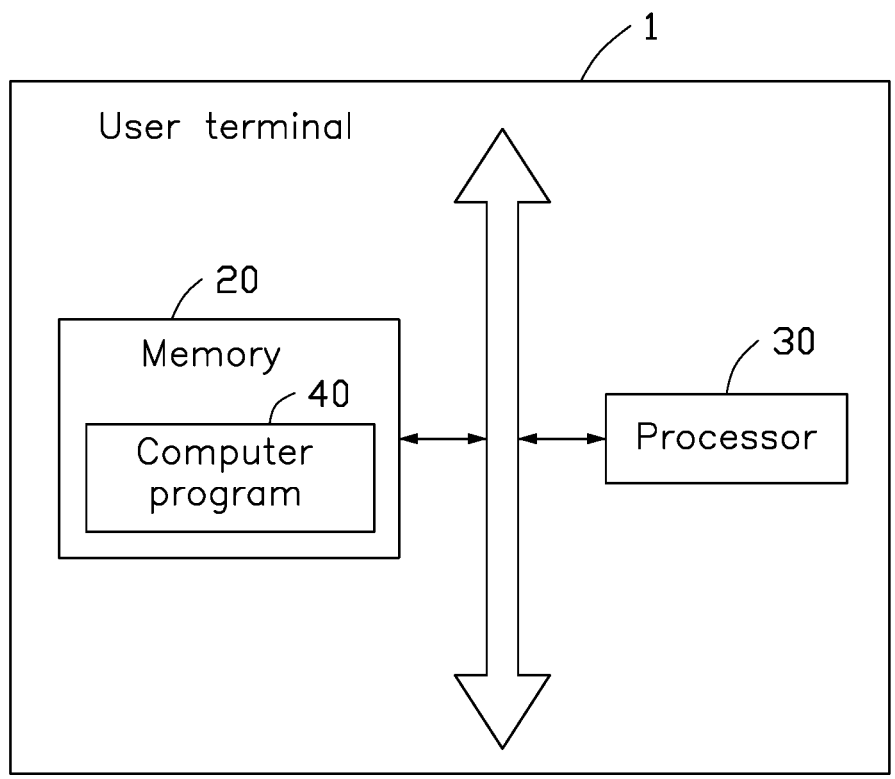
FIG. 4 is a schematic diagram of an embodiment of a user terminal.

FIG. 4 is a schematic diagram of an embodiment of the user terminal 1.

The user terminal 1 includes a memory 20, a processor 30, and a computer program 40, such as a disaster security resource calculation program, stored in the memory 20 and executable by the processor 30. When the processor 30 executes the computer program 40, the blocks in the embodiment of the disaster security resource calculation method shown in FIG. 2 may be implemented. Alternatively, when the processor 30 executes the computer program 40, the functions of the modules in the embodiment of the disaster security resource calculation system 10 shown in FIG. 3 may be implemented.

The user terminal 1 may be a computing device such as a desktop computer, a notebook, a palmtop computer, and a cloud server. Those skilled in the art should understand that the schematic diagram of the user terminal 1 does not constitute a limitation of the user terminal 1. The user terminal 1 may include more or fewer components than shown, or may combine some components. For example, the user terminal 1 may further include an input-output device, a network access device, a bus, and the like.

The processor 30 may be a central processing unit (CPU), or may be other general-purpose processors, digital signal processors (DSPs), application specific integrated circuits (ASICs), a Field-Programmable Gate Array (FPGA) or other programmable logic devices, discrete gate or transistor logic devices, discrete hardware components, etc. The general-purpose processor may be a microprocessor, or the processor 30 may be any conventional processor, etc. The processor 30 is a control center of the user terminal 1 and uses various interfaces and lines to connect various parts of the user terminal 1.

The memory 20 may be configured to store the computer program 40, and the processor 30 may execute the computer program 40. The data in the memory 20 may realize various functions of the user terminal 1. The memory 20 may mainly include a storage program area and a storage data area, wherein the storage program area may store an operating system, at least one application required by a function (such as a sound playback function, an image playback function, etc.). The storage data area may store data (such as audio data) and the like created according to the use of the user terminal 1. In addition, the memory 20 may include a high-speed random access memory, and may also include a non-volatile memory, such as a hard disk, an internal memory, a plug-in hard disk, a smart media card (SMC), a secure digital (SD) card, flash card, at least one disk storage device, flash memory device, or other non-volatile solid-state storage device.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A disaster security resource calculation method comprising:
    obtaining disaster prevention data of a place to be evaluated and loss assessment data of the place in a disaster scenario, wherein the disaster prevention data comprises environmental information, item information, and personnel information; and determining disaster security resources required by the place to be evaluated in the disaster scenario using a preset calculation model according to the disaster prevention data and the loss assessment data;

obtaining the disaster prevention data of the place to be evaluated, and simulating the place under different disaster scenarios through a disaster numerical simulation system to calculate the loss assessment data in each disaster scenario;

simulating the disaster prevention data of the place through a disaster prediction simulation system, and determining whether changes in the disaster prevention data will cause a disaster; wherein a method of determining whether the changes in the disaster prevention data will cause the disaster comprises:

dividing a range of change of the disaster prevention data of each place into a plurality of preset intervals, and inputting the disaster prevention data of each place into the disaster prediction simulation system in accordance with a change rule of the interval; and determining that the changes in the disaster prevention data will cause the disaster if the changes trigger a condition that causes the disaster.

2. The disaster security resource calculation method of claim 1,
wherein the condition that causes the disaster comprises temperature, dust content in air, and harmful gas concentration in the air.

3. The disaster security resource calculation method of claim 1, wherein a method of simulating the place under different disaster scenarios through the disaster numerical simulation system to calculate the loss assessment data in each disaster scenario comprises:

setting a loss ratio of each item in the place in a unit time in each disaster scenario;

dividing the item according to a preset ratio, wherein each region of the item after division represents a minimum financial amount of the item lost in the unit time during the disaster; and calculating the loss assessment data of the place in each disaster scenario according to the loss ratio of the item in the unit time and the minimum financial amount.

4. The disaster security resource calculation method of claim 1, wherein a training method of the preset calculation model comprises:

obtaining the disaster prevention data of different places, the loss assessment data of each place in disaster scenarios, and the disaster security resources required by each place in the disaster scenarios, correspondingly storing the disaster prevention data, the loss assessment data, and the disaster security resources required by each place in the disaster scenario, and dividing the disaster prevention data, the loss assessment data, and the disaster security resources into a training set and a validation set;

establishing a calculation model based on a neural network, and training parameters of the calculation model using the training set, wherein the disaster prevention data and the loss assessment data in the training set are used as input data of the calculation model, and the disaster security resources are used as output data of the calculation model;

using the validation set to validate the trained calculation model, and statistically obtaining a prediction accuracy of the trained calculation model based on the validation results;

determining whether the prediction accuracy of the trained calculation model is less than a preset threshold; and if the prediction accuracy of the trained calculation model is not less than the preset threshold, ending the training of the calculation model.

5. The disaster security calculation method of claim 4, further comprising:

if the prediction accuracy of the trained calculation model is less than the preset threshold, adjusting a structure of the calculation model, and using the training set to retrain the adjusted calculation model, wherein the structure of the calculation model comprises at least one of the number of convolution kernels, the number of elements in a pooling layer, and the number of elements in a fully connected layer;

using the validation set to validate the retrained calculation model, re-statistically obtaining the prediction accuracy of the retrained calculation model based on the validation results, and determining whether the prediction accuracy of the retrained calculation model is less than the preset threshold;

if the re-statistically obtained prediction accuracy of the retrained calculation model is not less than the preset threshold, ending the training of the calculation model; and if the re-statistically obtained prediction accuracy of the retrained calculation model is less than the preset threshold, repeating the above-mentioned adjustment and training steps until the prediction accuracy of the retrained calculation model is not less than the preset threshold.

6. A user terminal comprising:

a processor; and a memory storing a plurality of instructions, which when executed by the processor, cause the processor to:

obtain disaster prevention data of a place to be evaluated and loss assessment data of the place in a disaster scenario, wherein the disaster prevention data comprises environmental information, item information, and personnel information; and determine disaster security resources required by the place to be evaluated in the disaster scenario using a preset calculation model according to the disaster prevention data and the loss assessment data;

obtain the disaster prevention data of the place to be evaluated, and simulate the place under different disaster scenarios through a disaster numerical simulation system to calculate the loss assessment data in each disaster scenario;

simulate the disaster prevention data of the place through a disaster prediction simulation system, and determine whether changes in the disaster prevention data will cause a disaster; wherein a method of determining whether the changes in the disaster prevention data will cause the disaster comprises:

dividing a range of change of the disaster prevention data of each place into a plurality of preset intervals; inputting the disaster prevention data of each place into the disaster prediction simulation system in accordance with a change rule of the interval; and determining that the changes in the disaster prevention data will cause the disaster if the changes trigger a condition that causes the disaster.

7. The user terminal of claim 6, wherein the condition that causes the disaster comprises temperature, dust content in air, and harmful gas concentration in the air.

8. The user terminal of claim 6, wherein the processor simulates the place under different disaster scenarios through the disaster numerical simulation system to calculate the loss assessment data in each disaster scenario by:
setting a loss ratio of each item in the place in a unit time in each disaster scenario;
dividing the item according to a preset ratio, wherein each region of the item after division represents a minimum financial amount of the item lost in the unit time during the disaster; and
calculating the loss assessment data of the place in each disaster scenario according to the loss ratio of the item in the unit time and the minimum financial amount.

9. The user terminal of claim 6, wherein a training method of the preset calculation model comprises:
obtaining the disaster prevention data of different places, the loss assessment data of each place in disaster scenarios, and the disaster security resources required by each place in the disaster scenarios, correspondingly storing the disaster prevention data, the loss assessment data, and the disaster security resources required by each place in the disaster scenario, and dividing the disaster prevention data, the loss assessment data, and the disaster security resources into a training set and a validation set;
establishing a calculation model based on a neural network, and training parameters of the calculation model using the training set, wherein the disaster prevention data and the loss assessment data in the training set are used as input data of the calculation model, and the disaster security resources are used as output data of the calculation model;
using the validation set to validate the trained calculation model, and statistically obtaining a prediction accuracy of the trained calculation model based on the validation results;
determining whether the prediction accuracy of the trained calculation model is less than a preset threshold; and
if the prediction accuracy of the trained calculation model is not less than the preset threshold, ending the training of the calculation model.

10. The user terminal of claim 9, further comprising:
if the prediction accuracy of the trained calculation model is less than the preset threshold, adjusting a structure of the calculation model, and using the training set to retrain the adjusted calculation model, wherein the structure of the calculation model comprises at least one of the number of convolution kernels, the number of elements in a pooling layer, and the number of elements in a fully connected layer;
using the validation set to validate the retrained calculation model, re-statistically obtaining the prediction accuracy of the retrained calculation model based on the validation results, and determining whether the prediction accuracy of the retrained calculation model is less than the preset threshold;
if the re-statistically obtained prediction accuracy of the retrained calculation model is not less than the preset threshold, ending the training of the calculation model; and
if the re-statistically obtained prediction accuracy of the retrained calculation model is less than the preset threshold, repeating the above-mentioned adjustment and training steps until the prediction accuracy of the retrained calculation model is not less than the preset threshold.

11. A non-transitory storage medium having stored thereon instructions that, when executed by a processor of a user terminal, causes the processor to perform a disaster security calculation method, wherein the method comprises:
obtaining disaster prevention data of a place to be evaluated and loss assessment data of the place in a disaster scenario, wherein the disaster prevention data comprises environmental information, item information, and personnel information; and
determining disaster security resources required by the place to be evaluated in the disaster scenario using a preset calculation model according to the disaster prevention data and the loss assessment data;
obtaining the disaster prevention data of the place to be evaluated, and simulating the place under different disaster scenarios through a disaster numerical simulation system to calculate the loss assessment data in each disaster scenario;
simulating the disaster prevention data of the place through a disaster prediction simulation system, and determining whether changes in the disaster prevention data will cause a disaster; wherein a method of determining whether the changes in the disaster prevention data will cause the disaster comprises:
dividing a range of change of the disaster prevention data of each place into a plurality of preset intervals; and inputting the disaster prevention data of each place into the disaster prediction simulation system in accordance with a change rule of the interval; and determining that the changes in the disaster prevention data will cause the disaster if the changes trigger a condition that causes the disaster.

12. The non-transitory storage medium of claim 11, wherein the condition that causes the disaster comprises temperature, dust content in air, and harmful gas concentration in the air.

13. The non-transitory storage medium of claim 11, wherein a method of simulating the place under different disaster scenarios through the disaster numerical simulation system to calculate the loss assessment data in each disaster scenario comprises:
setting a loss ratio of each item in the place in a unit time in each disaster scenario;
dividing the item according to a preset ratio, wherein each region of the item after division represents a minimum financial amount of the item lost in the unit time during the disaster; and
calculating the loss assessment data of the place in each disaster scenario according to the loss ratio of the item in the unit time and the minimum financial amount.

14. The non-transitory storage medium of claim 11, wherein a training method of the preset calculation model comprises:
obtaining the disaster prevention data of different places, the loss assessment data of each place in disaster scenarios, and the disaster security resources required by each place in the disaster scenarios, correspondingly storing the disaster prevention data, the loss assessment data, and the disaster security resources required by each place in the disaster scenario, and dividing the disaster prevention data, the loss assessment data, and the disaster security resources into a training set and a validation set;

establishing a calculation model based on a neural network, and training parameters of the calculation model using the training set, wherein the disaster prevention data and the loss assessment data in the training set are used as input data of the calculation model, and the disaster security resources are used as output data of the calculation model;

using the validation set to validate the trained calculation model, and statistically obtaining a prediction accuracy of the trained calculation model based on the validation results;

determining whether the prediction accuracy of the trained calculation model is less than a preset threshold; and if the prediction accuracy of the trained calculation model is not less than the preset threshold, ending the training of the calculation model.

15. The non-transitory storage medium of claim 14, wherein the training method of the preset calculation model further comprises:

if the prediction accuracy of the trained calculation model is less than the preset threshold, adjusting a structure of the calculation model, and using the training set to retrain the adjusted calculation model, wherein the structure of the calculation model comprises at least one of the number of convolution kernels, the number of elements in a pooling layer, and the number of elements in a fully connected layer;

using the validation set to validate the retrained calculation model, re-statistically obtaining the prediction accuracy of the retrained calculation model based on the validation results, and determining whether the prediction accuracy of the retrained calculation model is less than the preset threshold;

if the re-statistically obtained prediction accuracy of the retrained calculation model is not less than the preset threshold, ending the training of the calculation model; and if the re-statistically obtained prediction accuracy of the retrained calculation model is less than the preset threshold, repeating the above-mentioned adjustment and training steps until the prediction accuracy of the retrained calculation model is not less than the preset threshold.

\* \* \* \* \*